(12) United States Patent
Gorrell

(10) Patent No.: US 7,935,930 B1
(45) Date of Patent: May 3, 2011

(54) COUPLING ENERGY FROM A TWO DIMENSIONAL ARRAY OF NANO-RESONANTING STRUCTURES

(76) Inventor: Jonathan Gorrell, Melrose, FL (US)

(*) Notice: Subject to any disclaimer, the term of this patent is extended or adjusted under 35 U.S.C. 154(b) by 177 days.

(21) Appl. No.: 12/497,660

(22) Filed: Jul. 4, 2009

(51) Int. Cl.
  *G01J 5/02* (2006.01)
(52) U.S. Cl. .................................. 250/341.1
(58) Field of Classification Search .... 250/338.1–338.5, 250/341.1–341.8, 458.1, 494.1; 324/317
  See application file for complete search history.

(56) References Cited

U.S. PATENT DOCUMENTS

| | | | |
|---|---|---|---|
| 7,361,916 B2* | 4/2008 | Gorrell et al. | 250/494.1 |
| 7,476,907 B2* | 1/2009 | Gorrell et al. | 257/88 |
| 7,659,513 B2* | 2/2010 | Gorrell et al. | 250/341.1 |
| 2007/0257199 A1* | 11/2007 | Gorrell et al. | 250/396 R |
| 2007/0257620 A1* | 11/2007 | Gorrell et al. | 315/5.39 |
| 2007/0257621 A1* | 11/2007 | Gorrell et al. | 315/5.39 |
| 2007/0257622 A1* | 11/2007 | Gorrell et al. | 315/39 |
| 2007/0257739 A1* | 11/2007 | Gorrell et al. | 331/94.1 |
| 2007/0258675 A1* | 11/2007 | Gorrell et al. | 385/14 |
| 2007/0259465 A1* | 11/2007 | Gorrell | 438/26 |

OTHER PUBLICATIONS van der Slot et al., "The Photonic FEL; Toward a Handheld THz FEL,", 2008, Proceedings of FEL08, Gyeounju, Korea, pp. 231-234.*

* cited by examiner

*Primary Examiner* — David P Porta
*Assistant Examiner* — Kiho Kim
(74) *Attorney, Agent, or Firm* — Gary W. Malhoit

(57) ABSTRACT

A device (100) includes a substrate (2) having a surface (4). A plurality of nano-resonate structures (8) is disposed in rows (12) and columns (14) on the surface (4). A generally two-dimensional charged particle beam (10) passes over at least a portion of the plurality of nano-resonant structures (8) and at a particular height above the surface. At least a portion of the plurality of nano-resonant structures (8) interact in response to the generally two-dimensional charged particle beam (10) and generate electromagnetic energy (16).

20 Claims, 4 Drawing Sheets

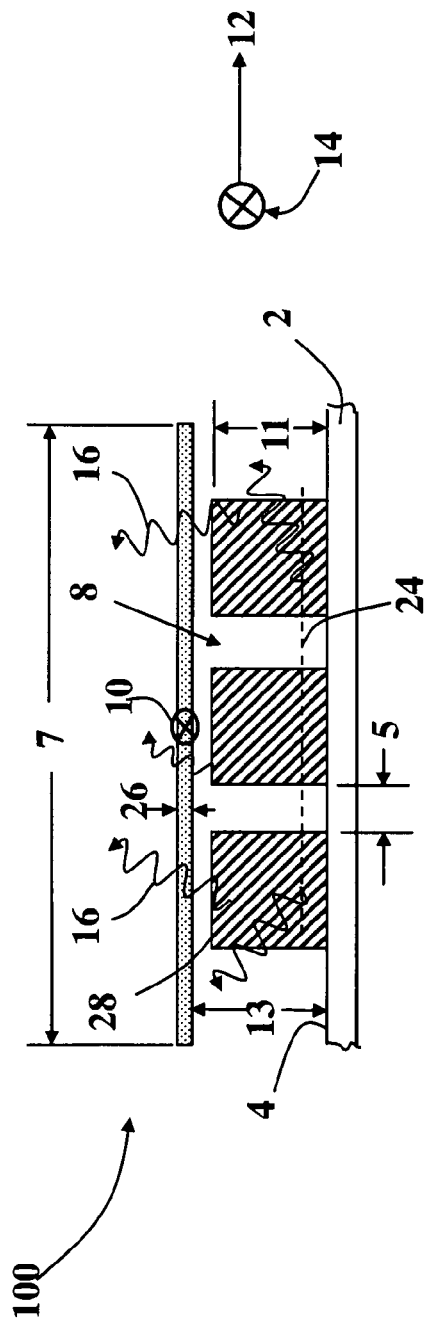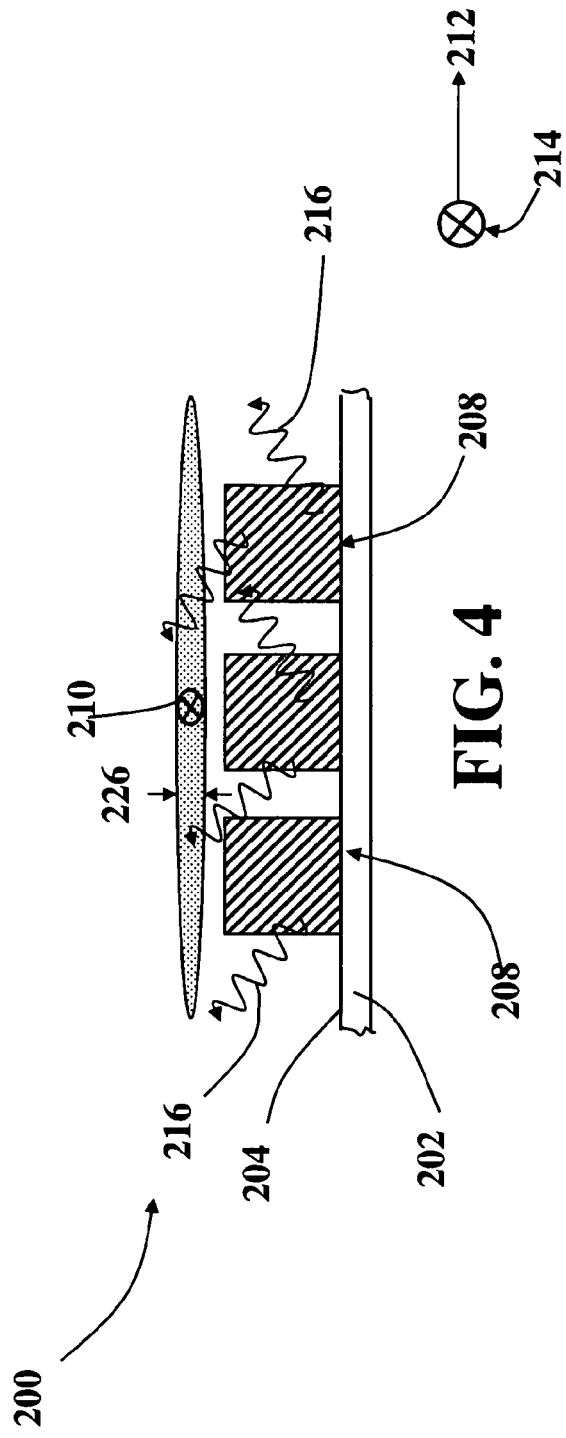

COUPLING ENERGY FROM A TWO DIMENSIONAL ARRAY OF NANO-RESONANTING STRUCTURES

BACKGROUND OF THE INVENTION

The present invention relates, in general, to generating electromagnetic radiation and, more particularly, causing interactions among a plurality of nano-resonant structures to generate electromagnetic radiation.

Electromagnetic radiation or energy is produced by the motion of electrically charged particles including oscillating electrons. For example, when an electron oscillates or is accelerated, varying electric and magnetic fields are generated, thereby emitting electromagnetic waves. The frequency of the emitted electromagnetic wave is a function of the rate the oscillation of the electron. Electromagnetic radiation can be generated across a vast spectrum of frequencies generally categorized as: Radio Frequency is less than 3 Gigahertz, Microwave is 3 Gigahertz to 300 Gigahertz, Infrared is 300 Gigahertz to 400 Terahertz, Visible is 400 Terahertz to 750 Terahertz, Ultraviolet is 750 Terahertz to 30 Petahertz, X-ray is 30 Petahertz to 30 Exahertz, and Gamma-ray is greater than 30 Exahertz.

The structures for generating and detecting electromagnetic radiation generally establish the particular portion of the frequency spectrum the electromagnetic radiation is produced. Structures used to generate higher frequency electromagnetic waves are typically small and more difficult to make. To make higher frequencies, structures are typically made to resonant. For example, klystrons and magnetrons generate microwave electromagnetic waves by using structures having resonate cavities. By further reducing the size of resonant structures, higher frequencies can be achieved. In another example, Smith and Purcell passed electrons over small structures referred to as a grating or a periodically varying metallic surface and generated electromagnetic waves in the visible portion of the electromagnetic spectrum. However, Smith-Purcell where unable to produce electromagnetic wave of sufficient intensity. This is primarily due to electrons being deflected by image charges in the grating. Smith-Purcell devices are inefficient. By increasing the period of the grating beyond the wavelength of the generated electromagnetic waves, Vermont Photonics was able to increase the intensity of the emitted electromagnetic waves.

Devices using resonant structures such as klystrons, backward wave devices, traveling wave tubes and magnetrons can be used to generate electromagnetic waves. Further, the size, structure, and tuning of the resonant cavity or cavities of the devices discussed above establish the characteristic frequency of electron oscillation. In U.S. Pat. No. 6,373,194, Small provides a method for making a micro-magnetron. In U.S. Pat. No. 4,740,973, Madey discloses a free electron laser, which uses relativistic electrons or positron beams and cavities to generate electromagnetic waves. In U.S. Pat. No. 6,909,104, Koops provides a device employing the free-electron laser and a periodic grating without requiring relativistic electrons. A paper by Potylitsin on Apr. 13, 1998 titled "Resonant Diffraction Radiation and Smith-Purcell Effect", calls for using a resonant diffraction grating. Further, in solid materials the interaction between an electromagnetic wave and a charged particle such as an electron can occur via three basic processes referred to as: absorption, spontaneous emission and stimulated emission. The interaction can provide a transfer of energy between the electromagnetic wave and the electron. For example, photoconductor semiconductor devices use the absorption process to receive the electromagnetic wave and transfer energy to electron-hole pairs by band-to-band transitions. Electromagnetic waves having an energy level greater than a material's characteristic binding energy can create electrons that move when connected across a voltage source to provide a current. In addition, extrinsic photoconductor devices operate having transitions across forbidden-gap energy levels use the absorption process (S. M., Sze, "Semiconductor Devices Physics and Technology", 2002). A measure of the energy coupled from an electromagnetic wave for a material is referred to as an absorption coefficient. A point where the absorption coefficient decreases rapidly is called a cutoff wavelength. The absorption coefficient is dependent on the particular material used to make a device. For example, gallium arsenide (GaAs) absorbs electromagnetic wave energy from about 0.6 microns and has a cutoff wavelength of about 0.87 microns. In another example, silicon (Si) can absorb energy from about 0.4 microns and has a cutoff wavelength of about 1.1 microns. Thus, the ability to transfer energy to the electrons within the material for making the device is a function of the wavelength or frequency of the electromagnetic wave. This means the device can work to couple the electromagnetic wave's energy only over a particular segment of the terahertz range. At the high end of the terahertz spectrum a Charge Coupled Device (CCD), such as an intrinsic photoconductor device, can successfully be employed. If there is a need to couple energy at the lower end of the terahertz spectrum certain extrinsic semiconductors devices can provide for coupling energy at increasing wavelengths by increasing the doping levels.

Raman spectroscopy is a well-known method to measure the characteristics of molecule vibrations using laser radiation as the excitation source. A molecule to be analyzed is illuminated with laser radiation and the resulting scattered frequencies are collected in a detector and analyzed. Analysis of the scattered frequencies permits the chemical nature of the molecules to be explored. Fleischmann in 1974 first reported the increased scattering intensities that result from Surface Enhanced Raman Spectroscopy (SERS), though without realizing the cause of the increased intensity. In SERS, laser radiation is used to excite molecules adsorbed or deposited onto a roughened or porous metallic surface, or a surface having metallic nano-sized features or structures. The largest increase in scattering intensity is realized with surfaces with features that are 10 100 nm in size. Research into the mechanisms of SERS over the past 25 years suggests that both chemical and electromagnetic factors contribute to the enhancing the Raman effect. (See, e.g., A. Campion and P. Kambhampati, Chem. Soc. Rev., 1998, 27 241.) The electromagnetic contribution occurs when the laser radiation excites plasmon resonances in the metallic surface structures. These plasmons induce local fields of electromagnetic radiation which extend and decay at the rate defined by the dipole decay rate. The local fields contribute to enhancement of the Raman scattering. Surface plasmons can propagate on the surface of a metal as well as on the interface between a metal and dielectric material. Bulk plasmons can propagate beneath the surface, although they are typically not energetically favored. Recent research has shown that changes in the shape and composition of nano-sized features of the substrate cause variation in the intensity and shape of the local fields created by the plasmons. Jackson and Halas (J. B. Jackson and N.J. Halas, PNAS, 2004, 101 17930) used nano-shells of gold to tune the plasmon resonance to different frequencies. Devices using the variation in the local electric field strength provided by the induced plasmon are known as SERS-based devices. In U.S. Patent Application 2004/0174521 A1, Drachev et al. describe a Raman imaging and sensing device employing nano-antennas. The antennas are metal structures deposited onto a surface. The structures are illuminated with laser radiation. The radiation excites a plasmon in the antennas that enhances the Raman scatter of the sample molecule. The electric field intensity surrounding the antennas varies as a function of distance from the antennas, as well as the size of the antennas. The intensity of the local electric field increases as the distance between the antennas decreases. Surface plasmons can be excited at a metal-dielectric interface by a monochromatic light beam. The energy of the light is bound to the surface and propagates as an electromagnetic wave. For more details on all the above application of generating electromagnetic waves or energy see U.S. Pat. No. 7,253,426.

There is a need to improve structures and methods and of generating electromagnetic energy having more intensity. In particular, there is a need to coupling energy from electromagnetic waves in the terahertz range from about 0.1 THz (about 3000 microns) to about 700 THz (about 0.4 microns), which is finding use in numerous new applications. These applications include improved detection of concealed weapons and explosives, improved medical imaging, finding biological materials, better characterization of semiconductors; and broadening the available bandwidth for wireless communications.

SUMMARY OF THE INVENTION

In one general aspect, the present invention is a device including a substrate with a surface. On the surface is disposed a plurality of nano-resonate structures arranged in rows and columns. A generally two-dimensional charged particle beam at a particular height above the surface passes over at least a portion of the plurality of nano-resonant structures. At least a portion of the plurality of nano-resonant structures interact in response to the generally two-dimensional charged particle beam and generate electromagnetic energy.

In another general aspect, the invention is a device comprising a substrate having a surface. On the surface is formed a plurality of nano-resonate structures configured in rows and columns. A generally two-dimensional charged particle beam travels substantially over and along at least two rows of the plurality of nano-resonant structures. At least a portion of the plurality of nano-resonant structures interact in response to the charged particle beam and generate electromagnetic energy.

In another general aspect the invention is a device including a substrate having a surface. A plurality of nano-resonate structures is randomly disposed on the surface. A generally two-dimensional charged particle beam passes over at least a portion of the plurality of the nano-resonant structures at a particular first height above the surface. At least a portion of the plurality of nano-resonant structures interact in response to the charged particle beam and generate electromagnetic energy.

A BRIEF DESCRIPTION OF THE DRAWING

FIG. 3 is a side view from a second direction of the portion of the nano-resonant device of FIG. 1;

FIG. 4 is side view of a nano-resonant device depicting another embodiment of a substantially two-dimensional charged particle beam.

DETAILED DESCRIPTION OF THE DRAWINGS

Generally, this invention is the generation of electromagnetic energy from the interaction among a plurality of nano-resonant structures caused by the proximity of a generally two-dimensionally charged particle beam. The generally two dimensionally charged particle beam is referred to as a two-dimensionally charged particle beam. More particularly, interactions can occur at least among adjacent nano-resonant structures along the path of the two-dimensional charged particle beam. Further, due to the substantial width of the two-dimensional charged particle beam, interactions can occur at least among adjacent nano-resonant structures oriented along a line that is transverse to the path of the two-dimensional charged particle beam. These interactions generate a significant increase in electromagnetic energy over using a substantially one-dimensional charged (i.e., spot beam) particle beam. The arrangement of nano-resonant structures can include an array of rows and columns or an irregular pattern. In any arrangement the nano-resonant structures are positioned in proximity with respect to one another. A cross-section of the two-dimensional charged particle beam can include generally an area of any shape. For example, the shape can include oval or a flattened rectangular shape referred to as a ribbon beam.

Figure 1:
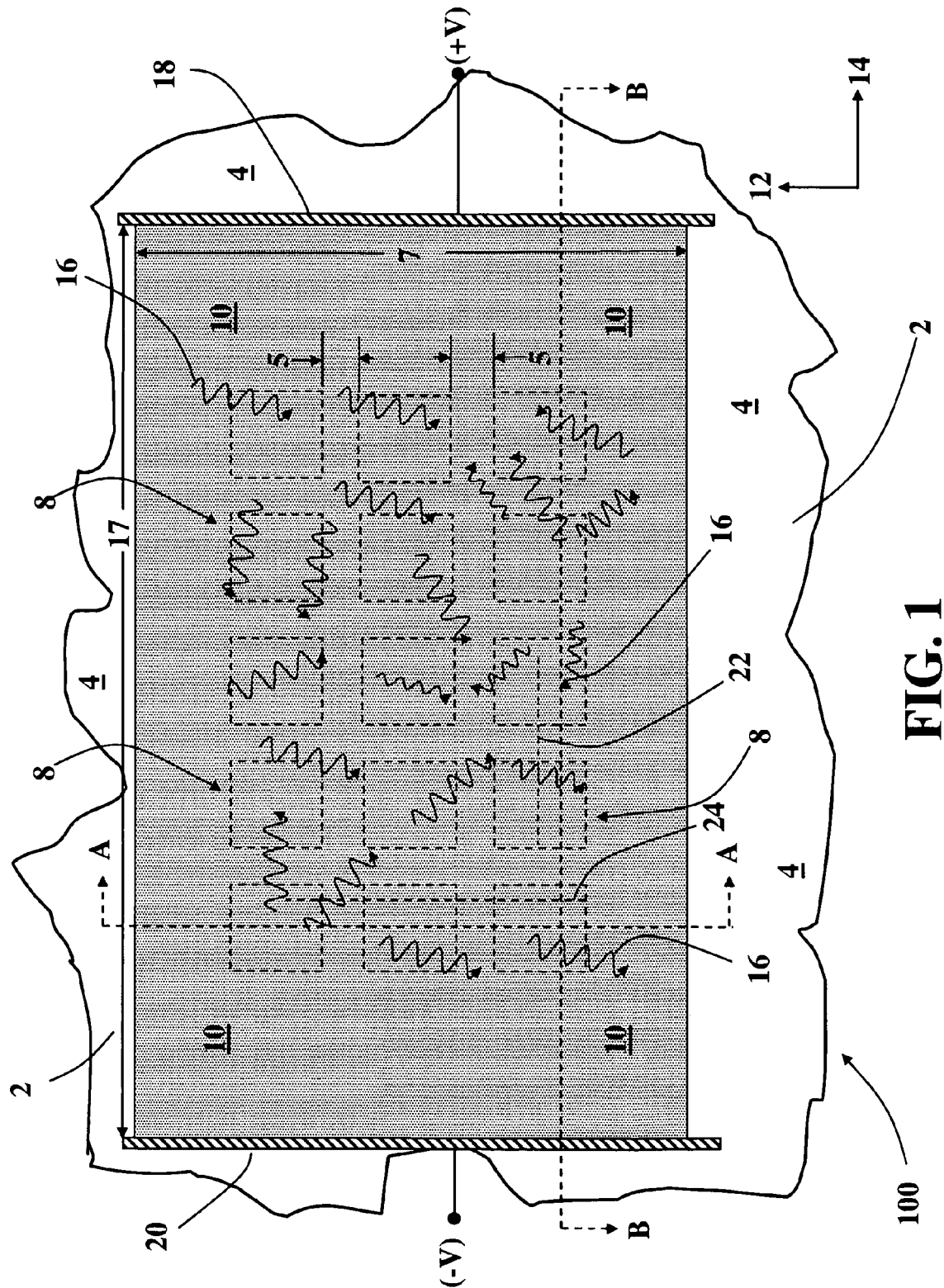
FIG. 1 is a top view of a portion of a nano-resonant device.

The present invention will be better understood from a reading of the following detailed description, taken in conjunction, with the accompanying drawing figures, in which like reference numbers designate like elements and in which:

FIG. 1 is a top view of a portion of a nano-resonant device or device 100 comprising a plurality of nano-resonant structures 8. This is referred to as a portion of the device 100, because other structures such as transistors can be included to perform other functions. The plurality of nano-resonant structures 8 is depicted as squares formed by dash lines. As shown, the nano-resonant structures 8 are arranged in an array of rows 12 and columns 14 formed on a major surface 4 of a substrate 2. Vertical and horizontal axes are shown with FIG. 1 and indicate the direction of the rows 12 and columns 14, respectively. The arrangement of the nano-resonant structures 8 should not be considered a limitation of the present invention. The shape of the nano-resonant structures 8 is shown as cubical. However, the shape of the nano-resonant structure 8 can include C-shaped, rectangular, semicircular, semi-ovular, or semi-rectangular and should not be considered a limitation of the present invention and can include straight and/or rounded edges and/or corners. A length 9 of one side of the nano-resonant structures 8 ranges from about 50 nanometers to about 250 nanometers. The fabrication materials of the nano-resonant structures 8 can include silver, high conductivity metals, and superconducting materials. The material can be opaque or semi-transparent. In one embodiment, the nano-resonant structures 8 can be made from at least one layer of metal (e.g., silver, gold, aluminum, platinum or copper or alloys made with such metals). The materials making up the nano-resonant resonant structures 8 may be deposited on the substrate 2 and then etched, electroplated to make the plurality of nano-resonant structures 8. The material used does not need to be a contiguous layer and can be a series of structures individually present on the substrate 2. The materials making up the nano-resonant structures 8 can be formed on the substrate 2 by a variety of techniques, such as by pulsed-plating, depositing or etching. The techniques for making the nano-resonant structures 8 are further discussed in "A Method of Patterning Ultra-Small Structures", Patent Publication 20070034518 and "Dry Reactive Ion Etching", Patent Publication 20060035173.

In FIG. 1, a beam 10 is depicted as the dotted region and travels along the rows 12 of the plurality of nano-resonant structures 8. The beam 10 is made of charged particles, which can include electrons, positive ions and the like. The beam 10 comprises a width 7 extending at least a distance 5 between adjacent rows 12. Hence, the beam 10 passes over at least two adjacent rows 12 of the nano-resonant structures 8 and is a substantially two-dimensional charged particle beam referred to as a two-dimensional charged particle beam 10. In other words, the two-dimensional charged particle beam 10 passes over at least a plurality of nano-resonant structures 8 generally disposed on a line transverse to the path of the two-dimensional charged particle beam 10. Here, the width 7 of the two-dimensional charged particle beam 10 extends fully over the entire array of the nano-resonant structures 8. In another embodiment (not shown), the two-dimensional charged particle beam 10 passes over only a portion of the plurality of the plurality of nano-resonant structures 8. In another embodiment, the two-dimensional charged particle beam 10 can be static or scanned or can include a plurality of spot beams.

In operation, the two-dimensional charged particle beam 10 passes over and in proximity to the nano-resonant structures 8. Next, the nano-resonant structures 8 interact or couple and generate electromagnetic energy or waves 16. The electromagnetic waves 16 are shown emitting from the nano-resonant structures 8 and can be emitted in a plurality of directions and frequencies. First, interactions can occur at least among adjacent nano-resonant structures 8, as depicted in FIG. 1, along or in the general direction of a line 22 of the two-dimensional charged particle beam 10. Second, as shown in FIG. 1, interactions can occur at least among adjacent nano-resonant structures 8 oriented along or in the general direction of a line 24, which is transverse to the path of the two-dimensional charged particle beam 10. It should be noted that the interactions among adjacent nano-resonant structures 8 are not limited to those nano-resonant structure 8 in contact with the lines 22 and 24. The lines 22 and 24 are only provided to help show the interactions of the nano-resonant structure 8 in relation to the direction or path of the two-dimensional charged particle beam 10. These interactions generate a significant increase in electromagnetic energy over using a single spot beam, which would generally pass over only one row, not a plurality of rows. The interaction or coupling of nano-resonant structures is further discussed in U.S. Pat. No. 7,361,916. In another embodiment, a plurality of layers and non-metallic structures (e.g., carbon nano-tubes and superconductors) can be used, as long as the nano-resonant structure 8 are excited or interact, as described here, by the passage of a beam 10.

An emitter 20, depicted in FIG. 1, can be a source of the two-dimensional charged particle beam 10. The emitter 20 can include a ribbon cathode, an electron gun and the like. The emitter 20 is shown as a cathode emitting electrons and connected to a negative voltage source (−V). The depiction of a cathode emitting an electron beam as the emitter 20 should not be considered a limitation of the present invention. Further, the emitter 20 is shown formed on the major surface 4 of the substrate 2. In another embodiment (not shown) the emitter 20 can be formed on another portion of the device 100 or on another device. The location of the emitter 20 for generating the two-dimensional charged particle beam 10 should not be considered a limitation of the present invention.

A collector 18, in FIG. 1, is shown receiving the electron beam as the two-dimensional charged particle beam 10 and is shown connected to a positive voltage source (+V) Like the emitter 20, the collector 18 should not be considered limited to being formed on the substrate 2 or receiving the two-dimensional charged particle beam 10.

Figure 2:
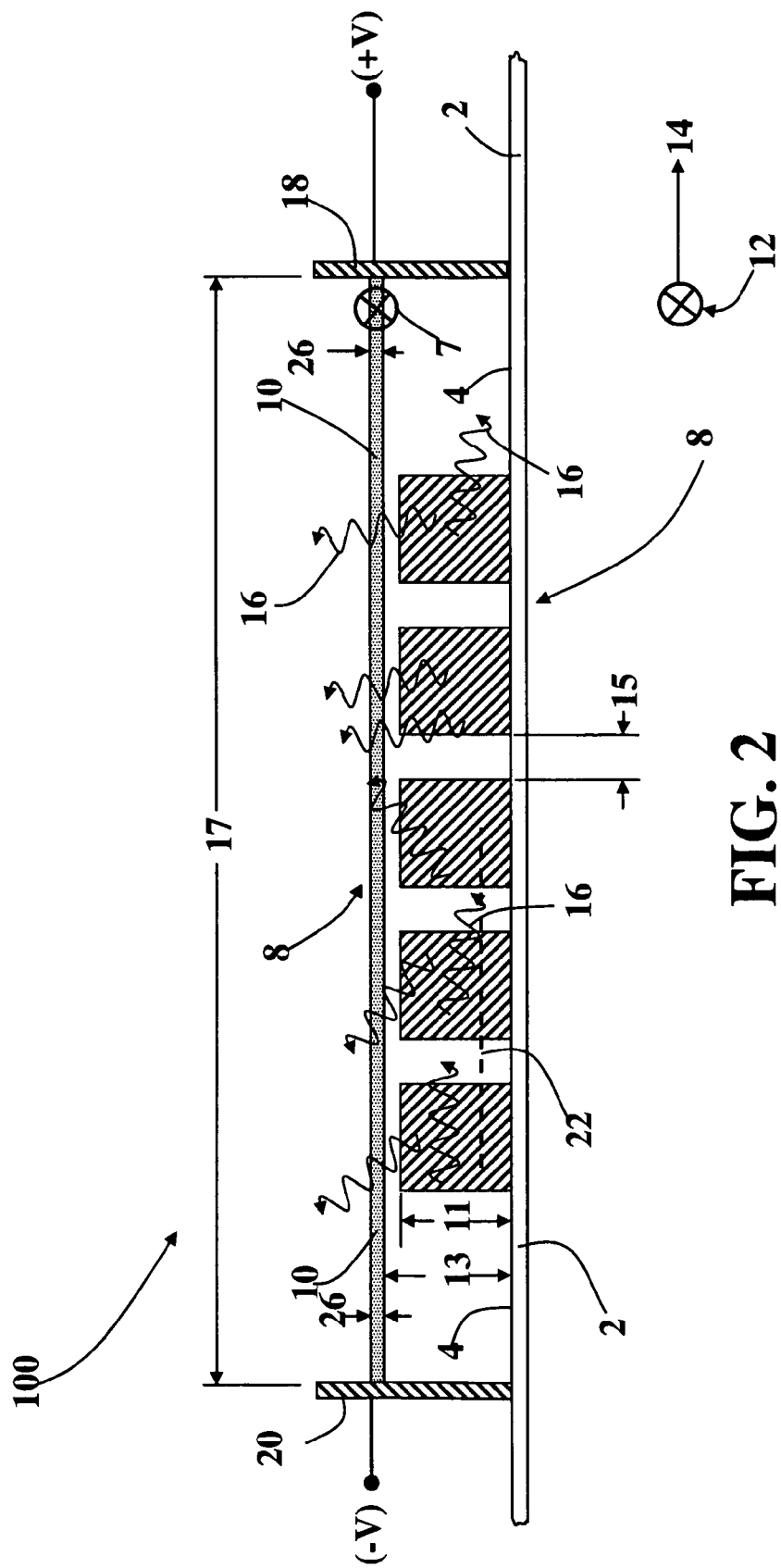
FIG. 2 is a side view from a first direction of the portion of the nano-resonant device of FIG. 1.

FIG. 2 is a cross sectional view (i.e., section B-B) of the device 100 shown in FIG. 1 and depicts the entire length 17 of the two-dimensional charged particle beam 10. The width 7 of the two-dimensional charged particle beam 10 is directed into the page. In FIG. 2, a portion of the two-dimensional charged particle beam 10 is illustrated passing over of the nano-resonant structures 8 of one of the rows 12. The axes are shown with FIG. 2 and indicate the direction of the rows 12 (i.e., into page) and columns 14, respectively. The two-dimensional charged particle beam 10 is shown generally parallel to the surface 4 of the substrate 2. This should not be considered a limitation of the present invention. As mentioned above, a portion of the interaction between the two-dimensional charged particle beam 10 and adjacent nano-resonant structures 8 can occur at least along the line 22. A height 13 of the two-dimensional charged particle beam 10 above the surface 4 is generally greater than a height or stature 11 of any one of the plurality of nano-resonant structures 8. The height 13 over the surface 4 is substantially one height, or a particular height. The height 13 can vary over a range depending on the size of the nano-resonant structures 8. A distance 15 between columns 14 of the nano-resonant structures 8 ranges from about 50 nanometers to about 120 nanometers. Further, the thickness 26 of the two-dimensional charged particle beam 10 is shown to be the same near the emitter 20 and near the collector 18. This should not be considered a limitation, because space charge effect can cause the two-dimensional charged particle beam 10 to disperse, thereby increasing the beam thickness 26 as the beam travels.

FIG. 3 is a cross sectional view (i.e., section A-A) of the device 100 shown in FIG. 1 illustrating the area or cross-section of the two-dimensional charged particle beam 10 as it passes over a portion of the nano-resonant structures 8. The two-dimensional charged particle beam 10 is depicted directed into the page. The cross-section of the two-dimensional charged particle beam 10 is generally rectangular. The shape of the cross-section can include elliptical, circular, to name a few. The shape of the cross-section should not be considered a limitation of the present invention. In particular, the two-dimensional charged particle beam 10, shown in FIG. 3, is passing over a portion of the nano-resonant structures 8 of one of the columns 14 and is illustrated transverse to the direction of the line 24. The axes are shown with FIG. 3 and indicate the direction of the rows 12 and columns 14 (i.e., into page), respectively. A portion of the interaction between the two-dimensional charged particle beam 10 and adjacent nano-resonant structures 8 can occur at least along the line 24. In other words, a portion of the interaction can occur among at least adjacent nano-resonant structures 8 of different rows 12. The distance between the nano-resonant structures 8 ranges from about 30 nanometers to about 90 nanometers.

FIG. 4 is a cross sectional view of a device 200 illustrating a two-dimensional charged particle beam 210 having a cross-section in the shape of an oval. The axes are shown with FIG. 4 and indicate the direction of the rows 212 and columns 214 (i.e., into page), respectively. The two-dimensional charged particle beam 210 is passing over a plurality of nano-resonant structures 208, which are formed on a surface 204 of a substrate 202 using methods as discussed under FIG. 1. Like the previous embodiment in FIG. 3, the two-dimensional charged particle beam 210 is shown passing over a plurality of rows of nano-resonant structures 208. The two-dimensional charged particle beam 210 is depicted directed into the page. This causes the nano-resonant structures 208 to interact and generate electromagnetic energy or waves 216. The method of making the device 200 can be similar to the processes used in making the device 100 under FIGS. 1-3. The size and shape of the nano-resonant structures 208 can be similar as well. The thickness 226 of the two-dimensional charged particle beam 210 is illustrated as thicker at the middle.

Figure 5:
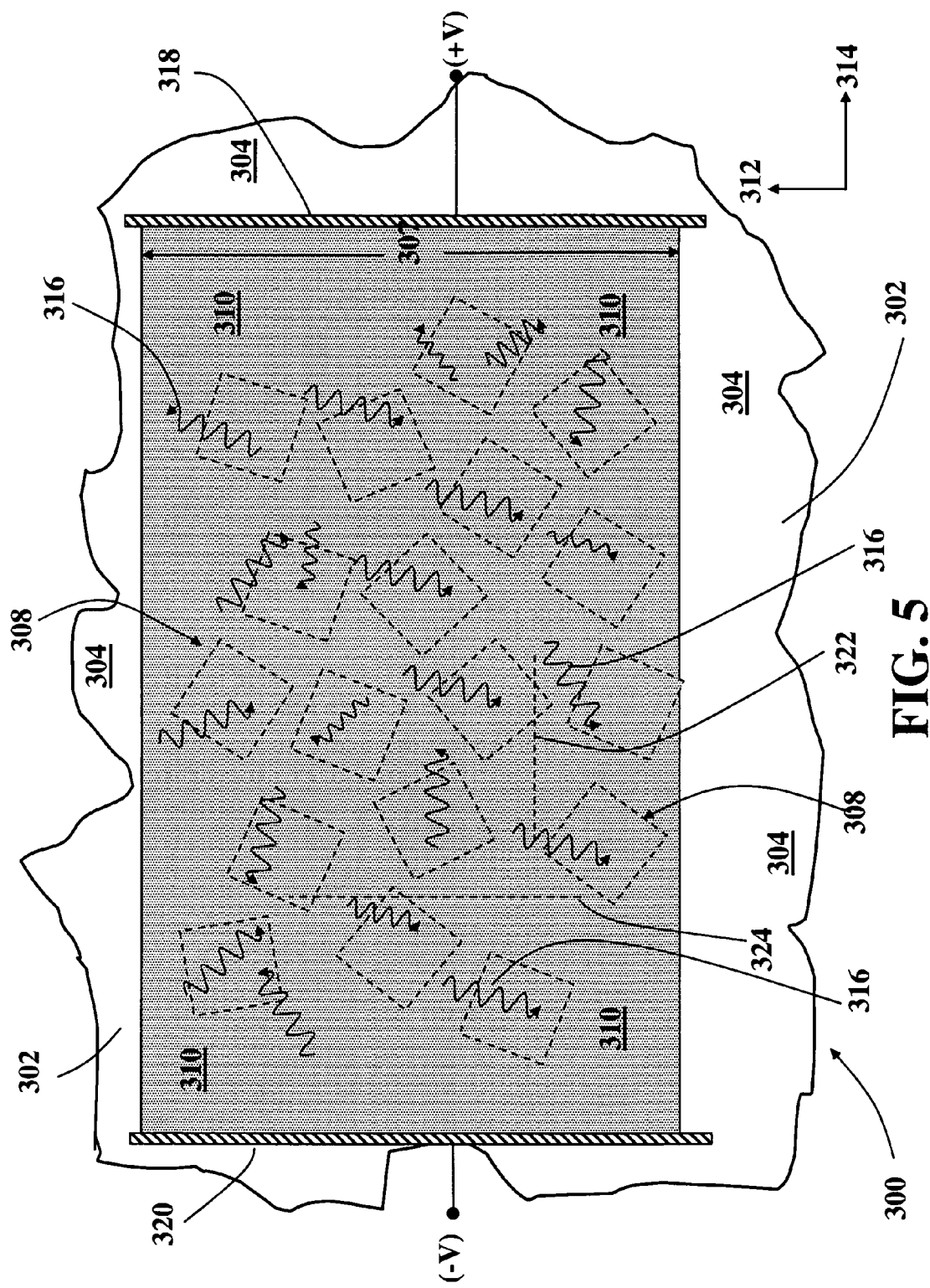
FIG. 5 a top view of another embodiment of a portion of a nano-resonant device.

FIG. 5 is a top view of a portion of a device or nano-resonant device 300 comprising a plurality of nano-resonant structures 308. The plurality of nano-resonant structures 308 is depicted as squares formed by dash lines. As shown, the nano-resonant structures 308 are randomly arranged and formed on a major surface 304 of a substrate 302. Vertical and horizontal axes are shown with FIG. 5 and indicate the direction of the rows 312 and columns 314, respectively. The shape of the nano-resonant structures 308 is shown as cubical. However, the shape of the nano-resonant structures 308 should not be considered a limitation of the present invention. The size of the nano-resonant structures 308 is within the range as mentioned under FIG. 1. The materials and method of making the nano-resonant structures 308 are similar to those mentioned under FIG. 1.

In FIG. 5, the beam 310 is depicted as the dotted region passing over the randomly arranged plurality of nano-resonant structures 308. The beam 310 is made of charged particles as mentioned under FIG. 1. The beam 310 comprises a width 307 extending fully over the randomly arranged nano-resonant structures 308. Hence, the beam 310 transversely passes over at least two adjacent nano-resonant structures 308 and is a substantially two-dimensional charged particle beam referred to as two-dimensional charged particle beam 310. In other words, the two-dimensional charged particle beam 310 passes over at least a plurality of nano-resonant structures 308. A portion of the plurality of nano-resonant structures 308 disposed generally transverse to the path of the two-dimensional charged particle beam 310. First, interaction can occur at least among adjacent nano-resonant structures 308, as depicted in FIG. 5, along a line 322 of the two-dimensional charged particle beam 310. From the top-view of FIG. 5, the height of the two-dimensional charged particle beam 310 cannot be shown. However, the height is similar to the depiction as shown in FIG. 2. as the height shown in FIG. 2) over the surface 304 is substantially one height, or a particular height. In other words, the height is measured between the plane of the two-dimensional charged particle beam 310 and the surface 304. Second, interaction can generally occur at least among adjacent nano-resonant structures on a line 324, as shown in FIG. 3, transverse to the direction of the two-dimensional charged particle beam 310. It should be noted that the interactions among adjacent nano-resonant structures 308 are not limited to those nano-resonant structure 308 in contact with the lines 322 and 324. These interactions generate a significant increase in electromagnetic energy over using a single spot beam, which would generally pass over in generally one dimension.

An emitter 320 and collector 318, illustrated in FIG. 5, respectively transmit and receive the two-dimensional charged particle beam 310. The emitter 320 and collector 318 are generally the same as used to generate the two-dimensional charged particle beam 310 as depicted in FIG. 1. Also similar to FIG. 1., the emitter 320 and collector 318 should not be considered limited to being formed on the substrate 302.

By now it should be appreciated a device for improving the emission of electromagnetic waves is provided by using a two-dimensional charged particle beam. The interaction generates a significant increase in electromagnetic energy over using a single substantially one-dimensional charged particle beam. The cross-section of the two-dimensional charged particle beam can include generally an area of any shape.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

The invention I claim is:

1. A device, comprising:
   a substrate having a surface
   a plurality of nano-resonate structures disposed in rows and columns on the surface; and
   a generally two-dimensional charged particle beam for passing over at least a portion of the plurality of nano-resonant structures and at a particular height above the surface, wherein the at least a portion of the plurality of nano-resonant structures, interact in response to the generally two-dimensional charged particle beam and generate electromagnetic energy.

2. The device of claim 1, wherein the generally two-dimensional charged particle beam passes over the nano-resonant structures on a generally straight path.

3. The device of claim 1, wherein the charged particle beam travels in a direction substantially along the rows.

4. The device of claim 3, wherein the charged particle beam comprises a width greater than at least the distance between adjacent rows.

5. The device of claim 1, wherein the charged particle beam comprises a plurality of charged particle beams.

6. The device of claim 1, wherein the charged particle beam comprises a rectangular cross-section.

7. The device of claim 1, wherein the charged particle beam comprises an elliptical cross-section.

8. The device of claim 1, wherein the charged particle beam comprises particles selected from the group of charged particles consisting of an electron, a positive ion, a negative ion and a proton.

9. The device of claim 1, wherein the respective rows and columns are perpendicular.

10. A device, comprising:
    a substrate having a surface;
    a plurality of nano-resonate structures disposed in rows and columns on the surface; and
    a generally two-dimensional charged particle beam for traveling substantially over and along at least two rows of the plurality of nano-resonant structures, wherein the at least a portion of the plurality of nano-resonant structures interact in response to the charged particle beam and generate electromagnetic energy.

11. The device of claim 10, wherein the rows and columns are transverse.

12. The device of claim 10, wherein the nano-resonant structures are cubically shaped.

13. The device of claim 10, wherein the nano-resonant structures are pyramidally shaped.

14. The device of claim 10, wherein the surface comprises a metal selected from the group of metals consisting of silver (Ag), gold (Au), copper (Cu) and alloys.

15. A device, comprising:
    a substrate having a surface;

a plurality of nano-resonate structures randomly disposed on the surface; and a generally two-dimensional charged particle beam for passing over at least a portion of the plurality of the nano-resonant structures at a particular first height above the surface, wherein the at least a portion of the plurality of nano-resonant structures interact in response to the charged particle beam and generate electromagnetic energy.

16. The device of claim 15, wherein nano-resonant structures extend a second height above the surface.

17. The device of claim 16, wherein the first height is generally greater than the second height.

18. The device of claim 15, wherein the plurality nano-resonant structures comprises a geometrical shape selected from the group of geometrical shapes consisting of cylindrical, cubical, pyramidal and parallelpipal.

19. The device of claim 15, wherein the charged particle beam comprises an oval cross-section.

20. The device of claim 15, wherein the interaction of the at least a portion of the plurality of nano-resonant structures occurs among at least adjacent nano-resonant structures along the charged particle beam and among at least adjacent nano-resonant structures positioned on a line transverse to the direction of the charged particle beam.

* * * * *